United States Patent [19]
Whitaker

[11] 3,942,231
[45] Mar. 9, 1976

[54] CONTOUR FORMED METAL MATRIX BLADE PLIES

[75] Inventor: Richard A. Whitaker, Willoughby, Ohio

[73] Assignee: TRW Inc., Cleveland, Ohio

[22] Filed: Oct. 31, 1973

[21] Appl. No.: 411,316

[52] U.S. Cl............. 29/156.8 B; 416/230; 228/193
[51] Int. Cl.² ..................... F01D 5/14; B23P 15/04
[58] Field of Search............... 416/229, 230, 241 A; 29/156.8 R, 156.8 B, 156.8 P; 228/193

[56] References Cited
UNITED STATES PATENTS

| 2,618,462 | 11/1952 | Kane ............................ 416/229 A |
| 2,853,271 | 9/1958 | Findley .......................... 416/229 A |
| 3,588,980 | 6/1971 | Cogan ........................... 29/156.8 B |
| 3,600,103 | 8/1971 | Gray et al ...................... 416/241 A X |
| 3,649,425 | 3/1972 | Alexander ................. 416/241 A UX |
| 3,701,190 | 10/1972 | Stone ............................... 29/156.8 |
| 3,711,936 | 1/1973 | Athey et al. ............. 416/241 A UX |
| 3,731,360 | 5/1973 | Stone ............................ 29/156.8 B |
| 3,749,518 | 7/1973 | Alver et al. ........................ 416/230 |
| 3,762,835 | 10/1973 | Carlson et al ..................... 416/224 |

FOREIGN PATENTS OR APPLICATIONS

| 1,041,251 | 10/1953 | France ............................... 416/223 |

*Primary Examiner*—Everette A. Powell, Jr.
*Attorney, Agent, or Firm*—Hill, Gross, Simpson, Van Santen, Steadman, Chiara & Simpson

[57] ABSTRACT

This invention deals with composite articles of predetermined contour and with methods for their manufacture. The basic method involves providing a plurality of plies of a consolidated monotape, with each of the plies being precontoured in terms of size and degree of twist such that upon stacking the plies together, the plies provide a composite article of predetermined contour. The plies are stacked in predetermined relationship and then diffusion bonded together under heat and pressure to provide a complex shape such as a turbine engine blade to within close tolerances.

4 Claims, 8 Drawing Figures

CONTOUR FORMED METAL MATRIX BLADE PLIES

BACKGROUND OF THE INVENTION

1. Field of the Invention

This invention is in the field of composite articles formed by bonding together piles of a consolidated monotape which have been pre-shaped to the extent that the bonding process does not cause significant distortion due to movement of the filaments within the monotape.

2. Description of the Prior Art

There has been increasing emphasis in recent times on the use of metal matrix composite articles for high temperature service, such as for use in turbine engine blades. Metal matrix composite blades are complex assemblies which may be made up of any one of a number of high strength-high modulus reinforcing filaments, a suitable matrix material in various forms, together with dovetail root blocks, root splaying wedges or shims and leading edge inserts. In the manufacture of such blades, the aerodynamic shape or volume of the blade must be precisely filled with these pieces without mislocation of or breaks in the reinforcing filaments, and without voids, cracks or inclusions in the matrix material.

As an example of the prior are in this area, there is the Gray U.S. Pat. No. 3,600,103 which issued on Aug. 17, 1971. This patent describes a compressor or fan blade made up of layers of high modulus fibers extending in parallel relation, the fibers being secured to an aluminum alloy sheet by means of a coating of an aluminum alloy. Sheet plies of this material are then stacked together in essentially flat relationship and bonded under high temperature and pressure to compact the plies and to cause the aluminum alloy to flow to fill the voids.

Kreider U.S. Pat. No. 3,699,623 which issued on Oct. 24, 1972 describes a method for protecting fiber reinforced aluminum matrix composite components which involves sheathing the composite with a protective skin of titanium or titanium alloy.

Stone U.S. Pat. No. 3,731,360 which issued on May 8, 1973 deals with a method of bonding a composite blade with an integrally attached root, wherein the composite fibers are compacted and the root blocks are bonded to one end of the layers of fibers in a single pressing and bonding operation.

In fabrication procedures where the blade preform is constructed flat or on a contour block using essentially flat plies, there will be lateral and axial flow of material as it is redistributed to fill the volume. Results achieved by such an approach are unpredictable and not necessarily reproducible. With the pieces involved having to move about to conform to the fixed volume of the tool, hard and soft spots can result which can cause undesirable filament breaks and/or voids.

SUMMARY OF THE INVENTION

The present invention makes use of consolidated monotapes in the manufacture of composite structures such as turbine engine blades. Each of said monotapes is a single sheet made up of collimated filaments surrounded by enough fully dense matrix metal to provide a lamella of the desired filament volume fraction. The use of this form of material in a laminated preform which is diffusion bonded to provide the finished article results in little or no debulk or flowing of the matrix during bonding. Each separate layer of the monotape is preshaped to a very close approximation of the final position it will assume during diffusion bonding in the final article. By this careful sizing and shaping of all the layers, both unidirectional and off-axis that go to make up the blade cross-section, all of the layers and inserts can be inspected, cleaned and preassembled into an accurate preform. When the blade preform is introduced into an accurate die cavity, under vacuum conditions, and the proper temperature-pressure relationships are established for diffusion bonding, and accurate, reproducible, sound structure results.

Numerous other features are involved in producing the high strength, high modulus laminates of the present invention. For example, some of the plies may have their high modulus filaments parallel to the major dimension of the ply in which they are included, and others of the plies may have their filaments at acute angles to the major dimension of that particular ply. Instead of using a large number of segmented plies, the preferred form of the present invention makes use of plies whose lateral edges define, in combination, surfaces of the finished article.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which.

DESCRIPTION OF THE PREFERRED EMBODIMENTS

The composite articles of the present invention can be made from a variety of intermediate material forms, reinforcements and matrices. The reinforcing filaments can be materials such as boron, silicon carbide coated boron, silicon carbide, boron nitride, coated boron, various forms of graphite and the like. Suitable matrices include materials such as aluminum alloys, titanium alloys, nickel alloys and the like.

The overall process for producing composite materials according to the present invention, when applied to turbine engine blades, includes the steps of first analyzing blade section charts by means of computer computation and descriptive geometry, thereby dividing the blade into a desired number of laminations taking account of any metallic inserts which are required in the root and the leading edge of the blade. After this analysis, a series of forming tools is generated by lifting plaster masters off the finish part master and at intermediate layers throughout the entire blade thickness by appropriate buildup of sheet material representing finished ply thicknesses in the finished part. Using these forming tools, appropriately mounted and heated, contoured ply blanks are produced singly or in stacks of multiple plies. With these ply blanks backed up by a suitable contoured tool, accurate ply shapes are cut, including stacking register marks such as lines, holes or notches and ply identification. The individual plies are then inspected by suitable nondestructive inspection and cleaned. The plies are then stacked, together with cover sheets and root inserts and fastened into an accurate, fully debulked blade preform. This blade preform is then introduced into the die for final diffusion bonding at high temperatures and pressures.

Figure 1:
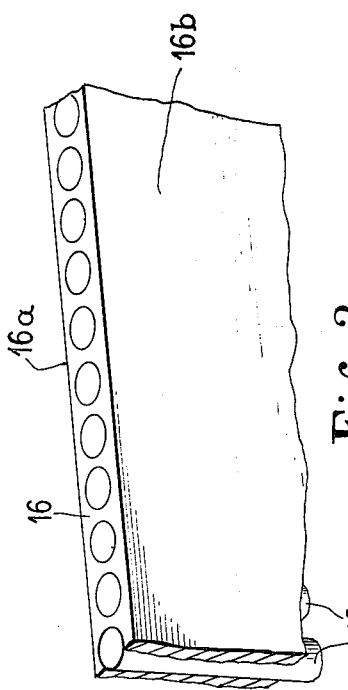
FIG. 1 is a view in elevation of a finished turbine engine blade produced according to the present invention.
Figure 2:
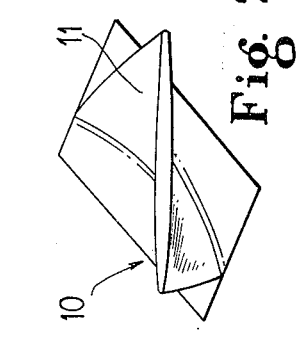
FIG. 2 is a plan view taken along the line II—II of FIG. 1 of the finished blade.

Referring now to the drawings, in FIG. 1 reference numeral 10 has been applied generally to a turbine engine blade including an airfoil portion 11, a typical pair of root blocks 12 and 13, and one or more wedges 14 there between. The extremely complex nature of the airfoil portion 11 is best evidenced from the plan view of FIG. 2.

Figure 3:
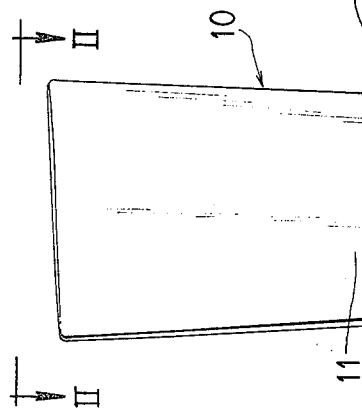
FIG. 3 is a greatly enlarged view in perspective, partially broken away, illustrating the structure of the consolidated monotape which forms the basic building unit of the present invention.

The starting material for making the blades of the present invention is illustrated in magnified form in FIG. 3. As there illustrated, the monotapes employed herein include a plurality of collimated high modulus fibers 15 completely embedded in a consolidated matrix 16 of a suitable metal such as aluminum. It should be noted that the matrix metal 16 completely surrounds the filaments 15 and presents planar surfaces 16a and 16b on opposite faces thereof.

Figure 4:
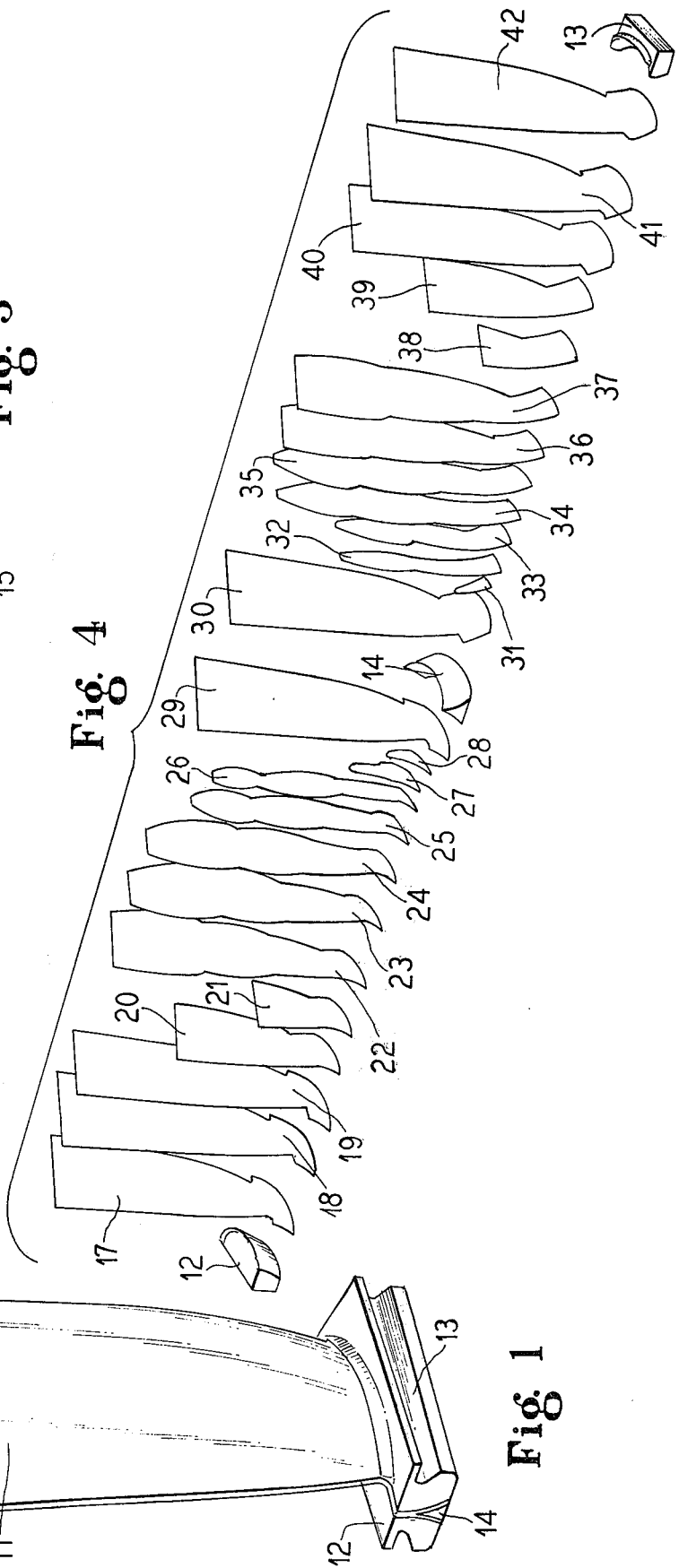
FIG. 4 is an exploded view of a typical assembly of monotape plies in combination with root blocks, wedge inserts, and shims making up a composite turbine engine blade.

FIG. 4 is an exploded view of a typical arrangement of plies formed from the monotapes and combined with the root blocks 12 and 13 and the wedge 14. The shape and twist of the individual plies are determined by computer computation and descriptive geometry from blade section charts which divide the blade into the desired laminations.

The array of plies shown in FIG. 4 can be divided into two sections, separated by the wedge 14. The first section contains an outer filler ply 17 composed entirely of an aluminum alloy. Next to ply 17 is a ply 18 composed of the suitably shaped monotape. For structural purposes, the filaments in the ply 18 may be disposed at an angle of about 45° in one direction with respect to the longitudinal axis of the ply 18. Next to ply 18 is a second ply 19 composed of a suitably shaped monotape, with the filaments in the ply 19 running 45° to the longitudinal axis of the ply 19, but in the direction opposite to the filament orientation in ply 18, i.e., the filaments of ply 19 are at an angle of 90° to the filaments in ply 18.

Another monotape ply 20 having its filaments oriented in the same direction as the filaments of the ply 18 is next in the series. A monotape ply 21 has its filaments oriented in the same direction as ply 19.

The next succeeding plies 22, 23, 24, 25, 26, 27 and 28 are all monotape plies with the direction of filament orientation being in line with the longitudinal axis of the ply. The final ply in this group is an aluminum alloy ply 29.

On the other side of the root wedge 14 there is a ply 30 composed of aluminum alloy. A series of plies 31, 32, 33, 34, 35, 36 and 37 are all composed of monolayer tape in which the filament orientation is in line with the longitudinal axis of the ply.

A ply 38 has its filaments oriented at 45° to the vertical axis. Similarly, a ply 39 has its filaments oriented at 90° to the filament orientation in ply 38. A pair of monotape plies 40 and 41 follow with their filament orientations at 45° to the longitudinal axis of the respective plies but in opposite directions. Finally, a filler ply 42 of aluminum alloy forms the outer surface of this stack of plies.

Figure 5:
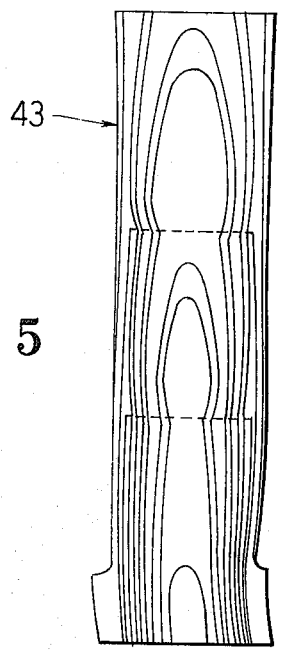
FIG. 5 is a view of a pack of ply preforms, representing half the blade, prior to diffusion bonding.
Figure 6:
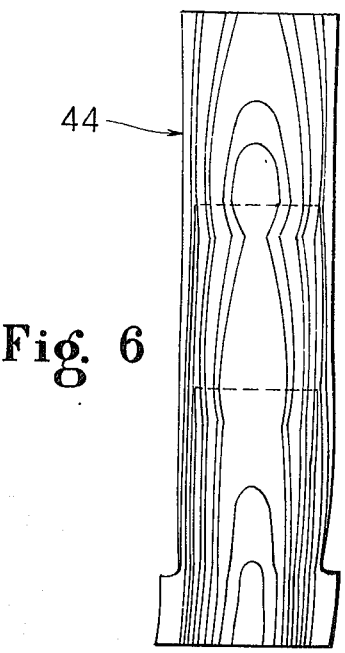
FIG. 6 is a view similar to FIG. 5 of the mating ply preform pack.
Figure 7:
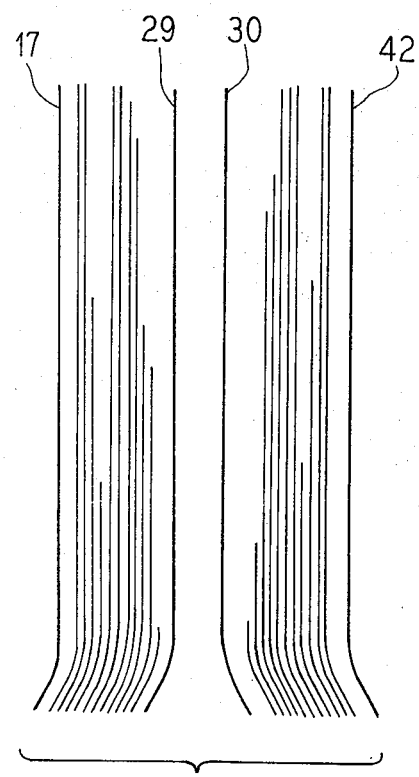
FIG. 7 is an exploded schematic view illustrating the manner in which a plurality of ply packs are combined prior to diffusion bonding.
Figure 8:
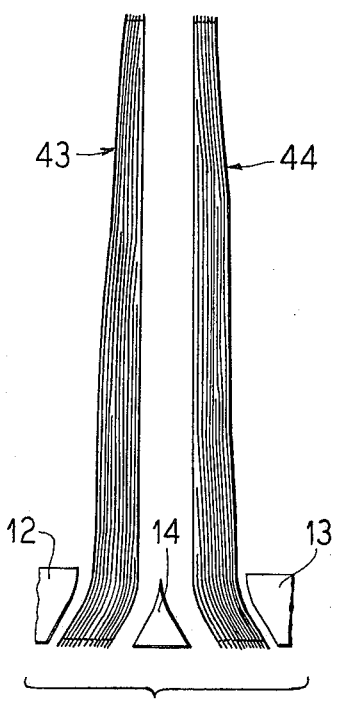
FIG. 8 is an exploded view of the ply packs and the root wedge as they are inserted into the diffusion bonding die.

The two stacks of plies are assembled as illustrated rather schematically in FIG. 7 to form preforms such as illustrated at reference numerals 43 and 44 in FIGS. 5 and 6, respectively. These two preforms are then assembled together with the root blocks 12 and 13 and the root wedge 14 and subjected to high temperature and pressure conditions sufficient to cause diffusion bonding.

By contour forming, the individual metal matrix composite blade plies prior to assembling them into a preform, it is possible to insure accurate, reproducible and sound blades after diffusion bonding. The plies which are pre-contoured in this manner are placed into the very shape they will assume in the finished diffusion bonded part. Because of this, there is no mislocation or breakage of filaments due to shifting during bonding, and voids, cracks, and inclusions in the matrix are minimized.

The above-described method of pre-contouring of plies applies to all combinations of matrix materials and reinforcements. The manner of assembling the blades used in the present invention makes it possible to non-destructively test the preforms by X-ray or other means before committing an expensive blade assembly to final diffusion bonding.

It should be evident that various modifications can be made to the described embodiments without departing from the scope of the present invention.

I claim as my invention:

1. The method of forming a turbine blade having predetermined contour and axial twist comprises providing a plurality of plies of consolidated monotape, each of said plies being made up of collimated filaments surrounded by enough dense matrix metal to provide a lamella of the desired filament volume fraction, pre-sizing and shaping each of said plies both unidirectionally and off-axis to the very shape and final position it will assume during fusion bonding in the final blade, stacking said pre-sized and shaped tapes together with cover sheets and root inserts into an accurate fully debulked blade preform with the lateral edges of the plies defining the surfaces of the blade, and diffusion bonding said plies together under heat and pressure to form the finished blade, thereby avoiding dislocation or breakage of filaments due to shifting during bonding and minimizing voids, cracks and inclusions in the matrix.

2. The method of claim 1 in which some of the ply are stacked with high modulus filaments parallel to the major dimensions of the ply in which they are included, and others of said plies are stacked with their filaments at acute angles to the major dimension of the ply in which they are included.

3. The method of claim 1 in which said monotape plies each comprise parallel filaments of boron completely enveloped in a matrix of aluminum.

4. The method of claim 1 in which the blade is stacked with outer plies and a center ply composed of metallic aluminum foil.

* * * * *